United States Patent
Young et al.

(10) Patent No.: US 6,376,964 B1
(45) Date of Patent: Apr. 23, 2002

(54) COLLOCATED ROTATING FLEXURE MICROACTUATOR FOR DUAL-STAGE SERVO IN DISK DRIVES

(75) Inventors: Kenneth F. Young; Edmund B. Fanslau, both of San Jose; Muhammad A. Hawwa, Fremont, all of CA (US)

(73) Assignee: Read-Rite Corporation, Fremont, CA (US)

( * ) Notice: Subject to any disclaimer, the term of this patent is extended or adjusted under 35 U.S.C. 154(b) by 0 days.

(21) Appl. No.: 09/860,158

(22) Filed: May 16, 2001

(51) Int. Cl.[7] .................................................. G11B 5/56
(52) U.S. Cl. ................ 310/311; 310/323.01; 310/244.5
(58) Field of Search ............................. 310/323.01, 311; 360/240, 250, 244.5, 244.9

(56) References Cited

U.S. PATENT DOCUMENTS

| | | | |
|---|---|---|---|
| 4,775,815 A | 10/1988 | Heinz | |
| 5,043,621 A | 8/1991 | Culp | |
| 5,466,985 A | 11/1995 | Suzuki | |
| 5,552,658 A | 9/1996 | Dibbern et al. | |
| 5,764,444 A | 6/1998 | Imamura et al. | |
| 5,786,655 A | 7/1998 | Okumura et al. | |
| 5,796,558 A | * 8/1998 | Hanrahan et al. | 360/294.2 |
| 5,801,908 A | 9/1998 | Akiyama et al. | |
| 6,020,674 A | 2/2000 | Zhang et al. | |
| 6,181,525 B1 | * 1/2001 | Carlson | 360/245.7 |
| 6,249,404 B1 | * 6/2001 | Doundakov et al. | 360/245.4 |
| 6,288,985 B1 | * 9/2001 | Jordache et al. | 369/112.24 |
| 6,301,080 B1 | * 10/2001 | Boutaghou | 360/255 |
| 6,320,730 B1 | * 11/2001 | Stefansky et al. | 360/294.4 |
| 6,321,974 B1 | * 11/2001 | Tsuchiya et al. | 228/1.1 |
| 6,335,847 B1 | * 1/2002 | Khan et al. | 360/244.5 |

* cited by examiner

*Primary Examiner*—Thomas M. Dougherty
(74) *Attorney, Agent, or Firm*—Oppenheimer Wolff & Donnelly LLP; Larry B. Guernsey

(57) ABSTRACT

A head gimbal assembly (10) for a disk drive (1), having a flexure (30) with a stationary portion (40) and at least one movable portion (42), a portion of the flexure (30) being attached to a load beam (28). A slider (20) containing a read/write head (22) is attached to one of the movable portions (40) of the flexure (30). The load beam (28) provides a center of rotation (54) for the slider (20) and one or more microactuators (24) connect between the stationary portion (40) of the flexure (30) and one of the movable portions (42, 44) for applying a moment which causes pure or nearly pure rotation of the slider (20) about the center of rotation (54).

A disk drive (1) and an actuator arm (2) including the head gimbal assembly (10) are also disclosed.

28 Claims, 7 Drawing Sheets

COLLOCATED ROTATING FLEXURE MICROACTUATOR FOR DUAL-STAGE SERVO IN DISK DRIVES

TECHNICAL FIELD

The present invention relates to disk drive actuator arms used with read/write heads in computer disk drives.

BACKGROUND ART

A computer disk drive stores and retrieves data by positioning a magnetic read/write head over a rotating magnetic data storage disk. The head, or heads, which are typically arranged in stacks, read from or write data to concentric data tracks defined on surface of the disks which are also typically arranged in stacks. The heads are included in structures called "sliders" into which the read/write sensors are imbedded during fabrication. The goal in recent years is to increase the amount of data that can be stored on each hard disk. If data tracks can be made narrower, more tracks will fit on a disk surface, and more data can be stored on a given disk. The width of the tracks depends on the width of the read/write head used, and in recent years, track widths have decreased as the size of read/write heads have become progressively smaller. This decrease in track width has allowed for dramatic increases in the recording density and data storage of disks.

Hard disk drives are typically formed with an actuator arm having a gimbal assembly with the read/write head attached. The actuator arm is positioned by using a voice coil motor (VCM), and as the disks rotate, the VCM pivots the actuator arm, moving the heads over the disk surfaces. By this rotating motion, the actuator operates to position the head above the disk to read or write data on a desired track. As storage capacity of disks increases, and tracks get narrower, the task of positioning the read/write head becomes increasingly difficult, coupled with the fact that another goal is to decrease "seek time" or the amount of time that it takes for a read/write head to locate and position itself over a desired track.

There have been several approaches to the problems of increasing the accuracy and speed of positioning the read/write heads. A prior system for positioning a read/write head over a data track employs a single stage actuator. The single stage actuator includes an actuator assembly, which pivots the actuator arm, enabling the head to read data from a particular data track. The actuator assembly typically uses the VCM alone to position the head. Disk drives with single stage actuators typically achieve a memory storage density of tens of thousands of data tracks per inch, but this density approaches the limit of a VCM's precision.

In an effort to achieve finer control over head positioning, a secondary actuator has sometimes been used with a two-stage actuator arm. A head suspension assembly (HSA) of the actuator arm is used as the two-stage actuator arm, and generally has a fixed portion and a movable portion, within the overall arm. The read/write head is attached to the end of the movable portion, and micro-actuator are connected between the two portions. When activated, the micro-actuator provides finer positioning adjustments to the coarser positioning provided by the VCM. These micro-actuator have used piezoelectric materials which vary their length or shape when a voltage is applied to them. Some prior actuators have had a hinge portion connecting the fixed and movable portions, and others have had the two portions completely separated from each other with only the micro-actuator connecting them. However, this type of actuator can have problems with out-of plane movement, as the slider is caused to roll slightly. This type of motion can potentially risk damage to the disk surface, or detrimental change in fly height (spacing of head to disk).

The data tracks are ideally symmetrical and uniform in curvature, but in practice, irregularities occur which can result in what is called "non-repeatable run-out". These irregularities make it necessary for the actuators to make small adjustments in position in order for the head to remain centered on the tracks. Disks typically include servo information which is read along with the other stored data. This servo information is sent to the control system which then generates control signals which help to steer the head back on track. For example, as the head encounters an irregularity in the track and begins to deviate from the track, the servo information signal can communicate this change to the control system, which then may activate a voltage to one of the micro-actuator motors to steer the head back in the direction of the track. The speed with which these irregularities can be sensed and corrected is an important factor in the proper operation of the disk drive. The number of these minute corrections which can be achieved each second is referred to as "bandwidth", and is measured in cycles per second. The greater the bandwidth, the greater the reliable operating speed of the disk drive can be, and ultimately, this allows greater storage capacity of the system.

Servo control systems generally operate better if the servo sensor and the actuator are near each other, rather than being separated in distance. The positioning of the sensor, in this case the read/write head, and the actuator in the same location is known as co-location or "collocation" as the term has evolved in the industry, and collocation generally results in improved bandwidth, and faster response time.

Potential difficulties exist with collocation configurations. The actuators are desired to be as small as possible so that they do not adversely affect the performance of the drive by adding too much additional mass or bulk to the actuator arm. The face of the slider which faces the disk is configured as an Air Bearing Surface (ABS) which has a distributed load over its face from the air pressure generated between the ABS and the disk surface. This is balanced by a spring force generated through the load beam, a force which can be as much as 30 mN (3 grams force). The force needed by the actuator to move the slider as it makes its many micro-corrections of position, depends greatly on the friction designed into the system. The friction between the flexure structure components and the slider can adversely affect the performance of the micro-actuator. The amount of friction force can be made smaller if the slider movement is rotational about a raised pivot point which contacts the slider or flexure component. The smaller the friction force to be overcome, the smaller the actuator can be, with accompanying advantages of reduced mass and volume, and thus improved performance for the disk drive, and increased practical storage capacity for the system.

FIG. 2 shows an actuator arm 2 which has an arm beam 6, which is configured in two parts which include a stationary part 12 and a movable part 14 which are connected by a narrow hinge portion 16. Two piezo-electric actuators 18 are connected between the two parts 12, 14, and act as a push-pull mechanism to direct the movable part 14. A slider 20 including a read/write head 22 is shown at the end of the movable part 14 of the actuator arm 2. A Voice Coil Motor (VCM) 9 acts as a primary actuator 7 and provides coarse positioning of the overall arm, and the piezoelectric actuators act as secondary actuators 8.

This is an example of a secondary actuator 8 in which the sensor, the read/write head 22 is separated from the actuator mechanisms 18, and thus the bandwidth is typically in the range of 1.5–3.0 kHz, which is improved compared to a bandwidth of 800–1 kHz typical for an actuator without secondary actuation, but less than that expected from a collocated actuator. In contrast, it is estimated that the bandwidth of collocated actuators is typically greater than 5 kHz.

Collocated actuators can have many configurations, but generally they include a Head Gimbal Assembly (HGA) having a load beam, and a flexure, also known as a gimbal, which is a thin springy member which functions as a leaf spring, as well as a slider containing the read/write head. Typically, actuators in the form of strips or tiny bars have been used, which have two ends, which will be referred to as the head end and the foot. In this configuration, the foot end is attached to the flexure, which acts as the stationary part and anchoring point for the actuators. The head end is attached to the slider or to a mount to which the slider is attached. When the actuators are activated by application of appropriate voltage, they deform in one of a variety of ways which serves to move the slider either laterally or laterally with some component of rotational movement with respect to the flexure. This movement is opposed by the friction generated when the upper surface of the slider rubs the lower surface of the flexure through translational movement. This frictional force for translational movement is higher than that which would be activated by a slider moving in a purely rotational manner about a raised pivot point, and thus a larger force is necessary to overcome this frictional opposition.

In addition, whenever there is frictional force which could result in abrasion of contacting surfaces, there is the possibility of freeing tiny particles, which can contaminate components. Thus, by reducing the frictional force and the contact areas involved, the risk of micro-contamination can be reduced.

Thus there is a need for a disk drive having a collocated actuator which acts through pure or nearly pure rotational movement.

DISCLOSURE OF INVENTION

Accordingly, it is an object of the present invention to provide a disk drive which has collocated actuators, with associated large bandwidth.

Another object of the invention is to provide head gimbal assembly which produces a smaller frictional force for the actuators to overcome.

And another object of the invention is to allow the use of smaller actuators which generate a smaller actuation force.

A further object of the present invention is to provide a HGA which acts through pure or nearly pure rotation to provide secondary collocational actuation.

An additional object of the present invention is to reduce the mass and/or volume of the HGA, and thus improve the operational dynamics of the system.

An additional object of the present invention is to reduce the micro-contamination caused by friction inside disk drives.

Briefly, one preferred embodiment of the present invention is a head gimbal assembly for a disk drive, having a flexure with a stationary portion and at least one movable portion, a portion of the flexure being attached to a load beam. A slider is attached to one of the movable portions of the flexure. A load beam provides a center of rotation for the slider and one or more microactuator motors connect between the stationary portion of the flexure and one of the movable portions for applying a moment which causes pure or nearly pure rotation of the slider about the center of rotation.

The flexure has a tongue which includes the stationary portion and a proximal movable portion and a distal movable portion which are connected by at least one hinge. The slider including a read/write head is attached to the proximal portion of the flexure tongue, and a dimple which projects from a load beam contacts the proximal portion to form the center of rotation. The microactuator connects between the stationary portion of the flexure and the distal portion so that when said at least one actuator is activated, movement is applied to the distal portion and then coupled to the proximal portion to create pure or nearly pure rotation of said slider about the center of rotation.

In a first preferred embodiment, the actuators act to impart lateral motion to the distal portion which in turn acts to impart rotary motion to the proximal portion about said center of rotation.

In a second preferred embodiment, the actuators act to impart rotary motion to the distal portion which in turn acts to impart rotary motion to the proximal portion about said center of rotation.

An advantage of the present invention is that the present invention provides large bandwidth.

Another advantage of the present invention is that the HGA acts through pure or nearly pure rotation about a pivot point with small contact area, thus providing a reduced coefficient of friction.

And another advantage of the present invention is that a smaller motivating force is required to position the read/write head, thus smaller or less massive actuators may be used.

A further advantage of the present invention is that improved dynamic performance is provided for the system.

An additional advantage is that enhanced tribology performance prevents micro-contamination.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which.

BEST MODE FOR CARRYING OUT THE INVENTION

Figure 1:
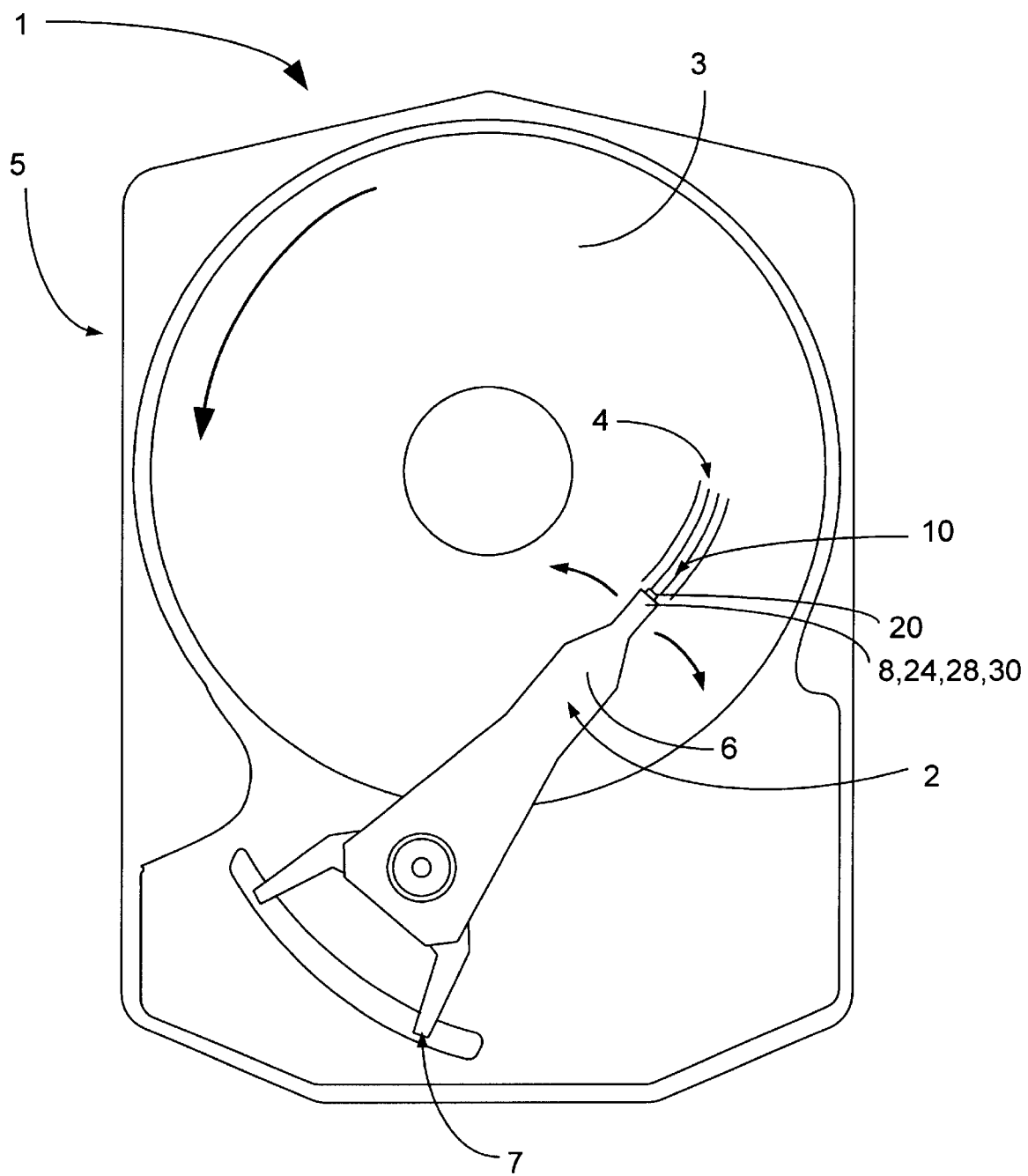
FIG. 1 shows a top plan view of a disk drive including the head gimbal assembly of the present invention.
Figure 2:
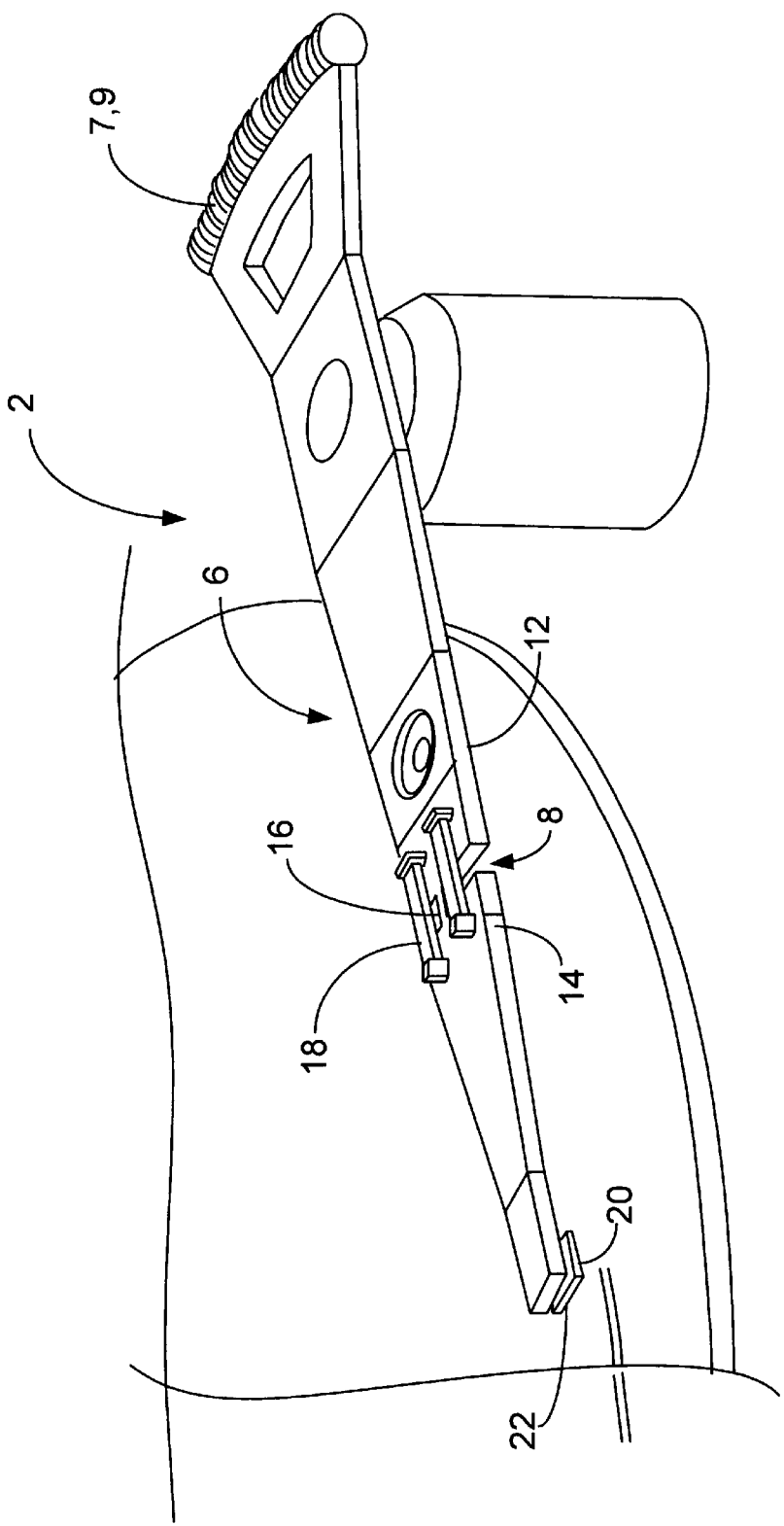
FIG. 2 illustrates a prior art actuator arm which has secondary actuators which are not collocated.

FIG. 1 shows a top plan view of a disk drive 1, which includes an actuator arm 2, a data storage disk 3 which has data tracks 4, and an enclosure 5. The actuator arm 2 generally includes an arm beam 6, and a primary actuator 7, and a head gimbal assembly 10. The head gimbal assembly includes a load beam 28, flexure 30, slider 20 and secondary actuator 8, which is a collocated actuator 24. These are seen in greater detail in FIG. 5 below.

Figure 3:
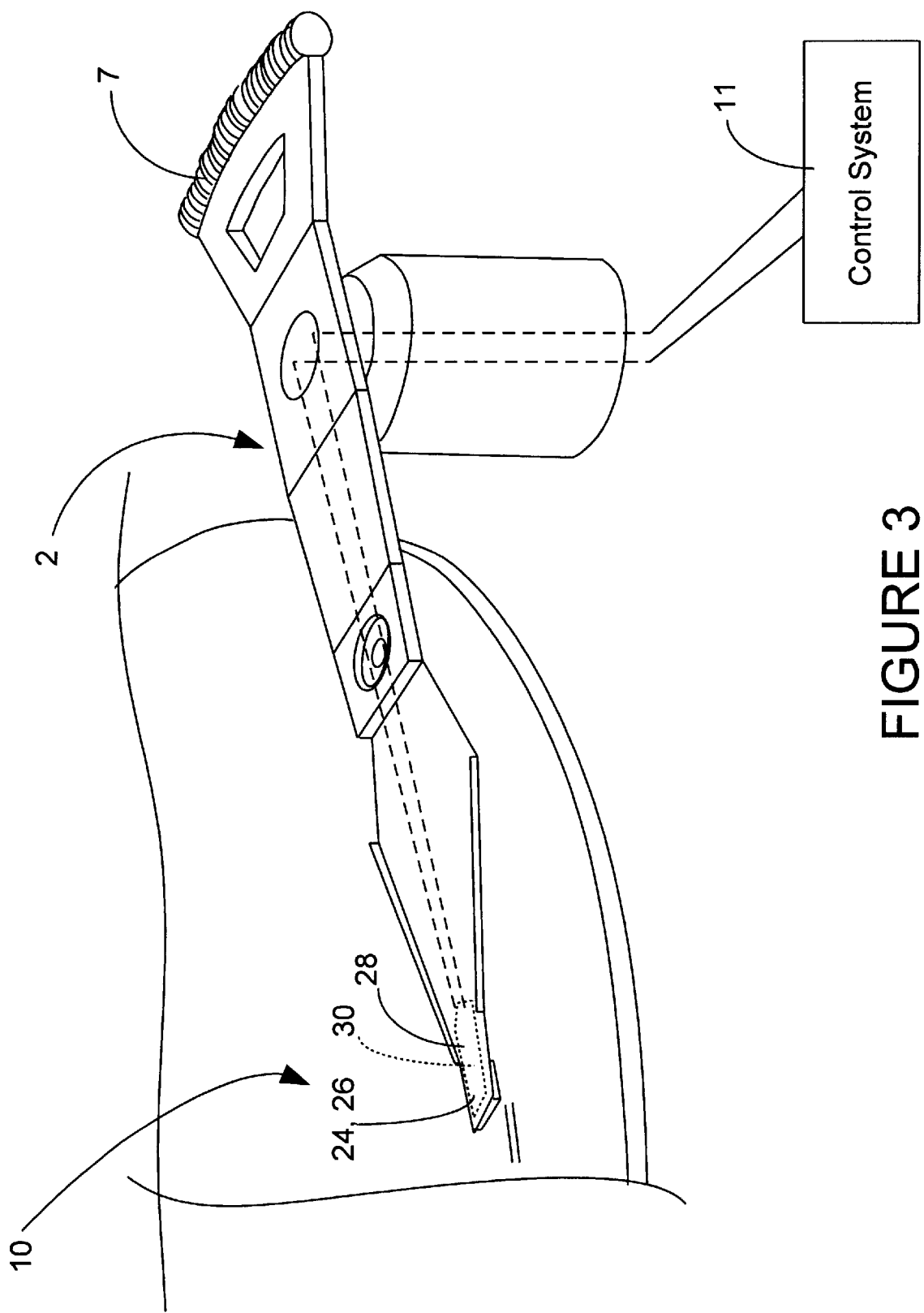
FIG. 3 shows an actuator arm having collocated secondary actuation.

FIG. 3 shows an actuator arm 2 which has collocated actuator 24. It includes a Head Gimbal Assembly (HGA) 10 having a load beam 28, and a flexure 30, also known as a gimbal, which is a thin springy member which functions as a leaf spring, which supports the slider 20, but allows for a slight amount of vertical movement as the leaf spring deflects.

Referring now also to FIG. 3, and as discussed above, the data tracks 4 are ideally symmetrical and uniform in curvature, but in practice, irregularities occur which can result in what is called "non-repeatable run-out". These irregularities make it necessary for the actuator 24 to make small adjustments in position in order for the head 22 to remain centered on the tracks 4. Disks 3 typically include servo information which is read along with the other stored data. This servo information is sent to the control system 11 which then generates control signals which help to steer the head 22 back on track. For example, as the head 22 encounters an irregularity in the track 4 and begins to deviate from the track 4, the servo information signal can communicate this change to the control system 11, which then may activate a voltage to the micro-actuator 24 to steer the head 22 back in the direction of the track 4.

Figure 4:
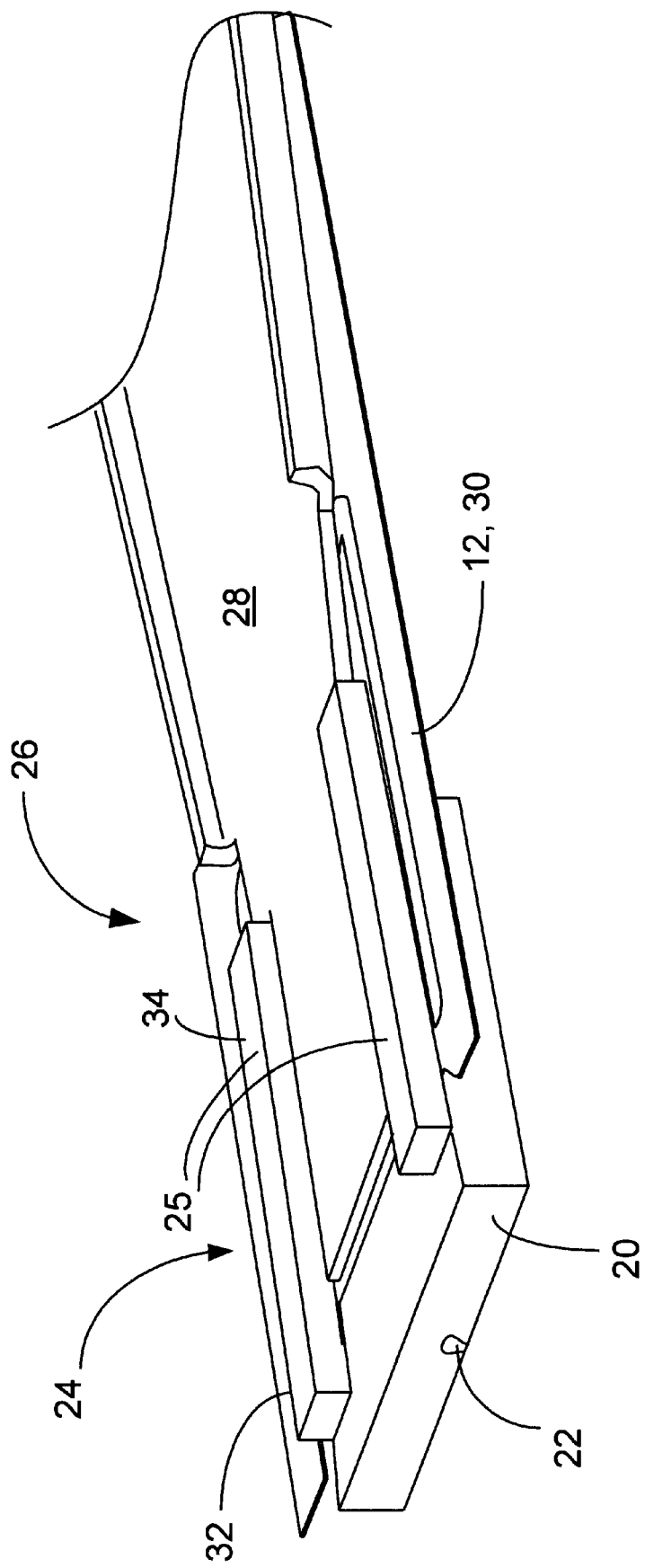
FIG. 4 illustrates a detail isometric view of the head gimbal assembly.

FIG. 4 shows a detail view of a typical Head Gimbal Assembly, in which the load beam 28, flexure 30, and collocated actuator 24 can be seen, as well as a slider 20 containing the read/write head 22. The actuator 24 includes one or more actuator motors 25. The actuator motors 25 have two ends, which will be referred to as the head end 32 and the foot 34. The foot end 34 is attached to the flexure 30, which acts as the stationary part 12 and anchoring point for the actuator motors 25. The head end 32 is attached to a second portion of the flexure, which is not visible here, and which will be described in detail below.

Figure 5:
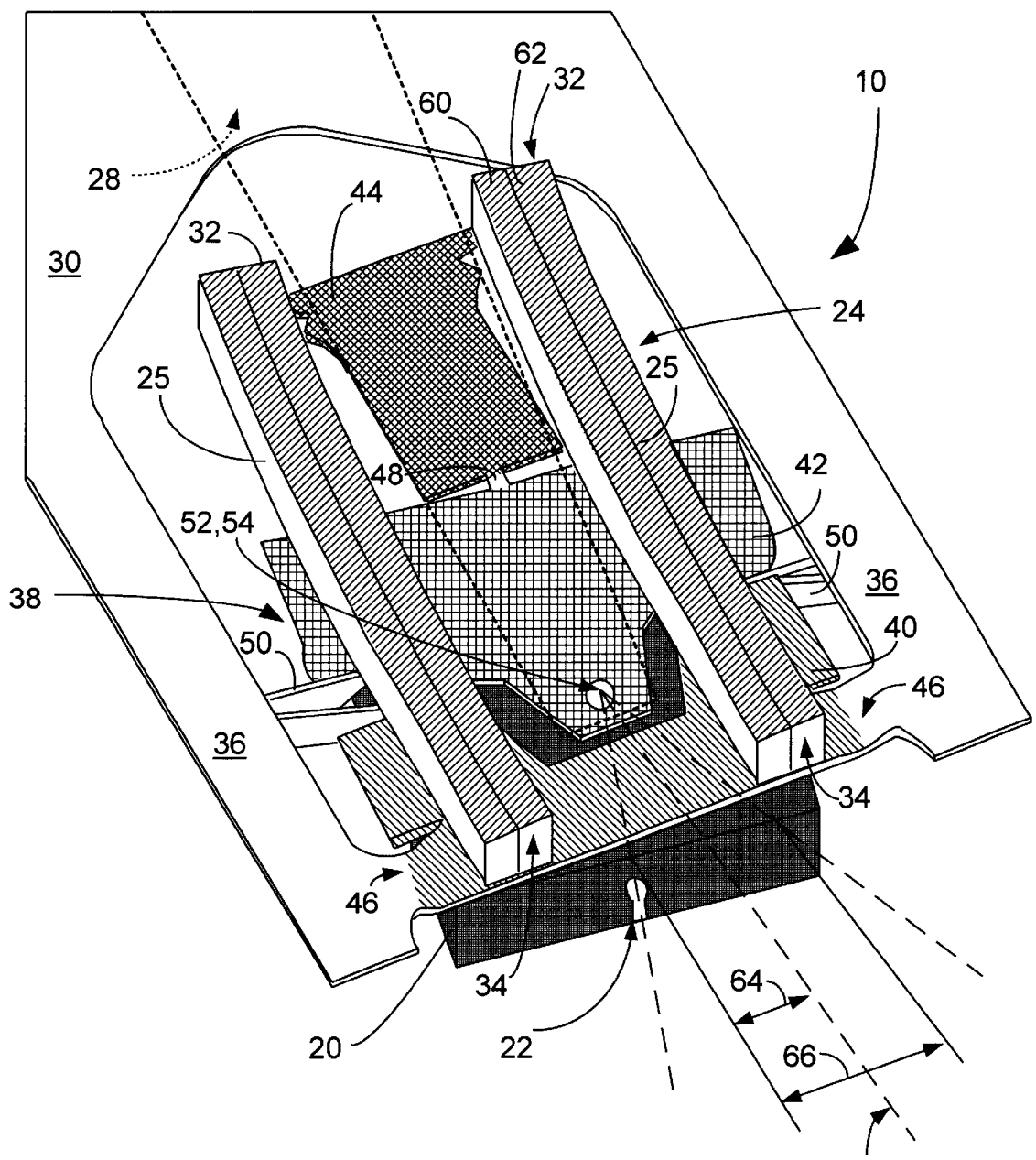
FIG. 5 shows a top isometric view of the head gimbal assembly of the present invention with the load beam removed for easier viewing.

FIG. 5 shows a top isometric view of a first preferred embodiment of a Head Gimbal Assembly (HGA) 10 of the present invention. It is attached to a load beam 28, shown here in dashed line for easier viewing of the other components which would be otherwise hidden. The flexure 30 includes a pair of prongs 36 and a tongue 38 which is divided in three parts, and which have been differently shaded to make viewing easier. The three parts of the tongue 38 include a stationary tongue portion 40, shaded in diagonal lines, a proximal portion 42, shaded in coarse cross-hatch, and an distal portion 44, shaded in fine cross-hatch, proximal and distal being named in reference to the center of rotation, to be discussed below. The stationary tongue portion 40 is attached to the side prongs 36 by bridge portions 46. The proximal portion 42 is connected to the distal portion 44 by a hinge 48, and to the stationary portion 40 by flexible ties or side springs 50. A slider 20 containing, a read/write head 22 is attached to the proximal portion 42. A pair of piezoelectric actuators having a head end 32 and a foot end 34 is positioned with the foot end 32 attached to the stationary portion 40, and the head attached to the distal portion 44. The load beam 28 contacts the proximal portion 44 at a dimple 52, which is a projecting portion of the load beam 28. This dimple 52 serves as the center of rotation 54. The center of rotation 54 preferably corresponds roughly to the center of the slider 20 for purposes of flying dynamics of the slider's air-bearing surface, but this is not to be construed as a limitation. It will be obvious to one skilled in the art that other structures can serve as a center of rotation for the slider 20, such as having a dimple which projects upwards from the proximal tongue portion 40, or the slider 20 itself, rather than having a dimple which projects from the load beam 28 downwards.

The piezoelectric motors may operate in a number of manners. In one embodiment, the actuator motors 25 may be extension motors or bimorphs, which are made of two or more layers of piezoelectric laminate having a first layer 60 of laminate and a second layer of laminate 62. These two layers 60, 62 are polarized in opposite directions so that when voltage is applied through electrical interfaces (not shown here), one will contract while the other will expand in length, thus causing the composite actuator motor 25 to curve in a similar manner to that of the curling in a heated bimetallic strip. This curving causes sideways motion of the head ends 32 relative to the feet 34. Since the head ends 32 are attached to the distal portion 44 of the flexure tongue 38, this motion, conveyed through the hinge 48, causes the proximal portion 42 to move and to rotate about the dimple 52, which is also the center of rotation 54. Since the slider 20 is attached to the proximal portion 42, it too rotates about the center of rotation 54, and is displaced from the normal direction line 63 by the amount indicated in the drawing as the displacement 64. The actuators are configured to curve in opposite direction as the voltages applied are reversed, so the displacement can be expected to extend on either side of the normal direction line 63. This total displacement 66 is thus the range of correction that the secondary actuator can achieve in addition to any coarse correction created by the primary actuator.

The springs 50 connecting the stationary portion 40 to the proximal movable portion 42, tend to bias the proximal portion 42 and the attached slider 20 to be in alignment with the normal direction line 63, or in other words, to return to a "home position" when the actuator motors 25 are not activated to displace the sensor 22.

An important advantage of the present invention is that by engaging in pure, or nearly pure rotation about the center of rotation 54, which is the dimple 52, the proximal portion 42 of the tongue 38 encounters a much smaller frictional force that it would sliding laterally across the lower surface of the load beam 28. Since the frictional force is reduced, the piezoelectric actuators can be smaller, thus reducing the mass at the end of the flexure 30, and improving the dynamic characteristics of the system.

Piezoelectric actuator motors 25 may be used in a variety of other configurations as well. As well as flexing, the actuator motors 25 may be used in a push-pull manner so that a first actuator may expand while the second contracts, thus causing the distal portion 44 of the tongue 38 to rotate. This causes the proximal portion 42, through the hinge 48, to rotate, thus again causing displacement of the sensor 22.

Micro-Electro-Mechanical Systems (MEMS) or electromagnetic motors may also be used in a similar manner to the piezoelectric actuators, and in fact, any micro-device which is capable of creating a rotational moment about the center of rotation may be used. Although the actuators are shown here being used in pairs, it is also possible to use a single actuator which changes direction with the polarity of the applied voltage. For instance, a single actuator may theoretically be used in the embodiment of FIG. 5, and it may possibly be attached directed to the proximal portion 42, however for symmetry, balance and speed of response, a pair of actuators are favored, and the use of an distal portion 44 is preferred to give a longer lever arm which allows a smaller force to be used.

Figure 6:
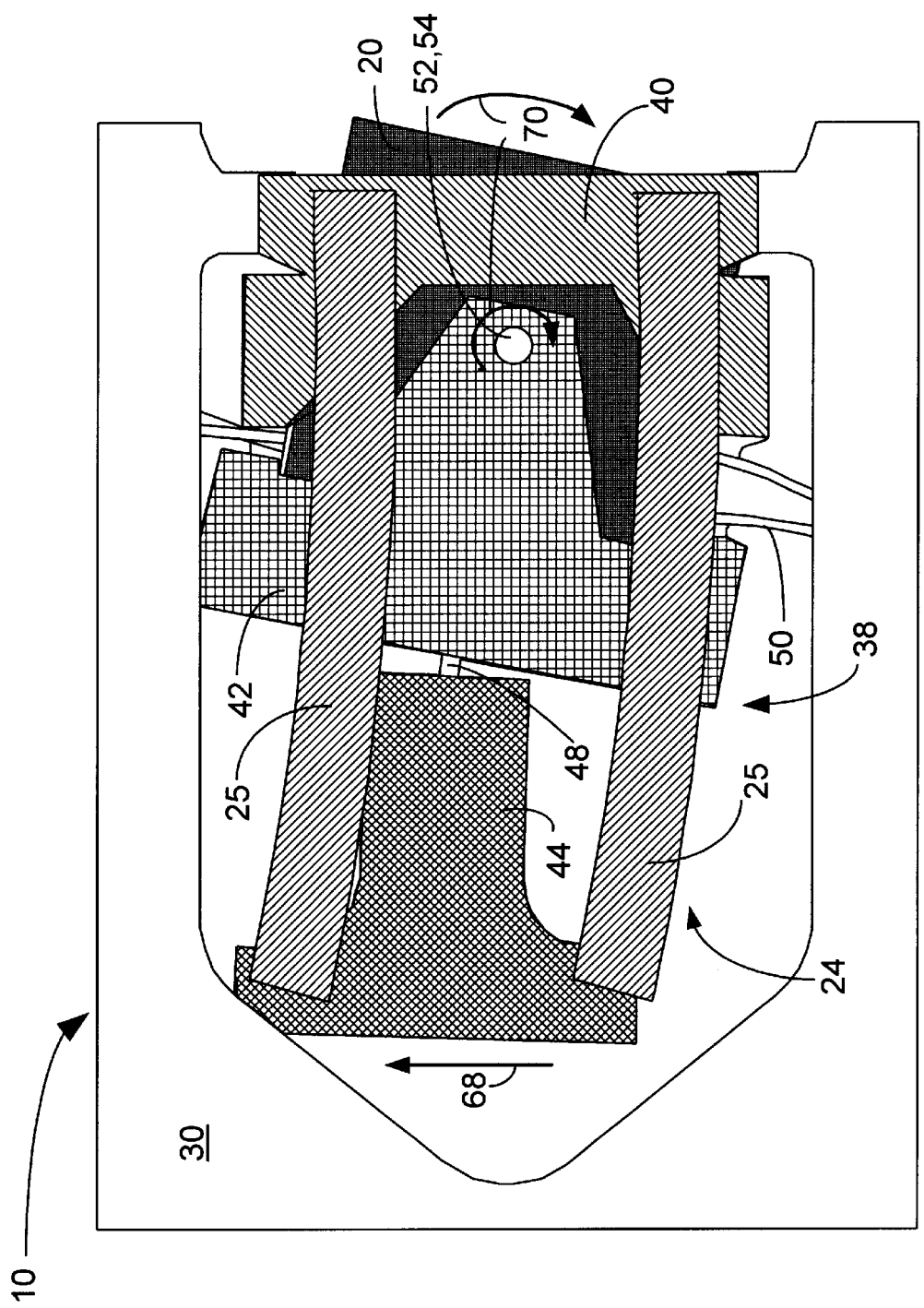
FIG. 6 illustrates a top plan view of a head gimbal assembly of the present invention with the load beam removed for easier viewing, showing actuators configured to provide lateral translational movement of the distal tongue portion.
Figure 7:
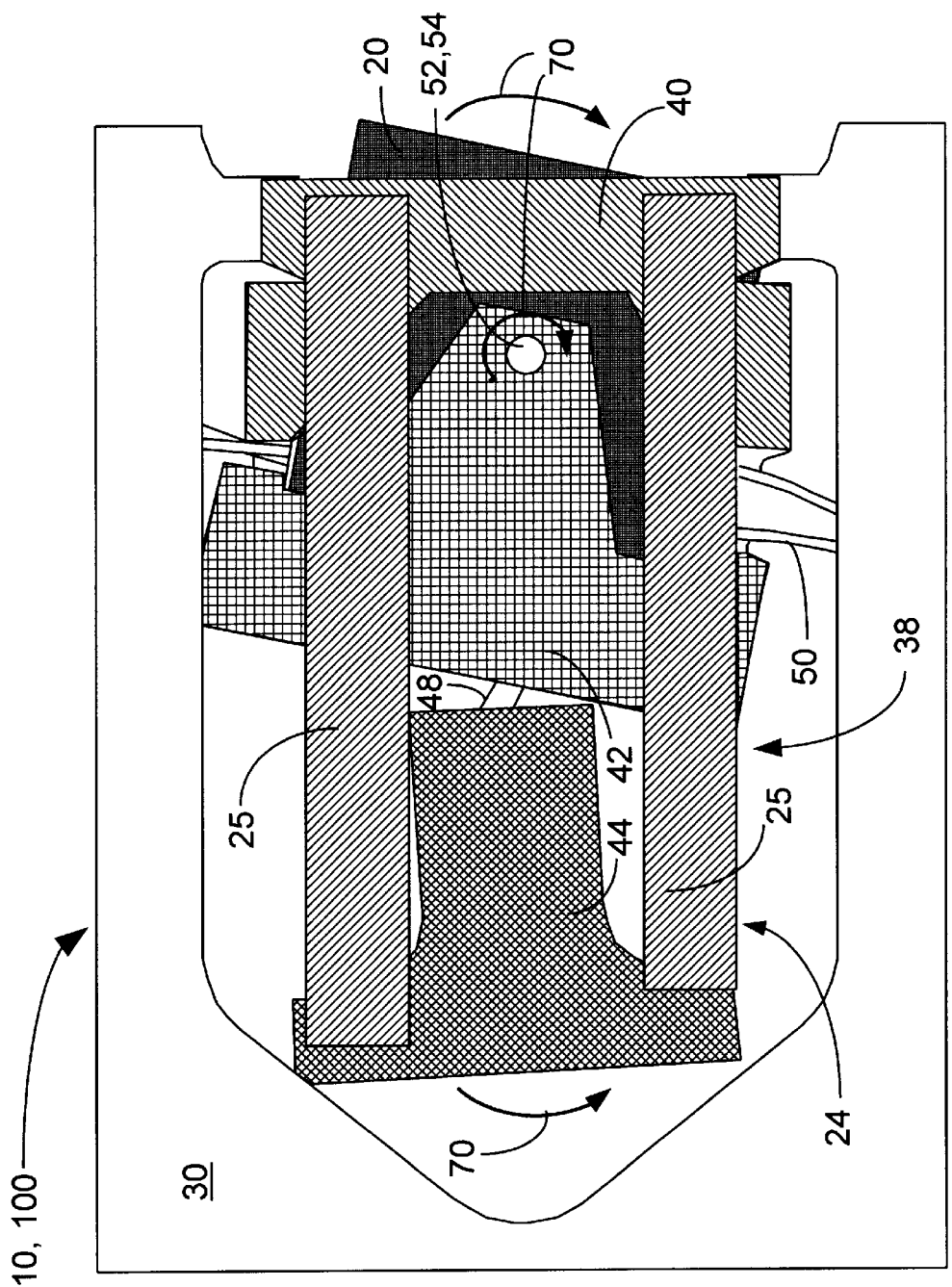
FIG. 7 illustrates a top plan view of a head gimbal assembly of the present invention with the load beam removed for easier viewing, showing actuators configured to provide rotational movement of the distal tongue portion.

FIGS. 6 and 7 show top plan views of the head gimbal assembly 10 with the load beam again removed for easier viewing. The head gimbal assembly 10 again includes the flexure 30 with the three-part tongue 38, the actuator motors 25, and the slider 20. The stationary tongue portion 40 is again shown connected to the proximal tongue portion 42 by springs 50, and the distal tongue portion 44 is coupled to the proximal portion 42 by a hinge 48. In FIG. 6, the actuator motors 25 used are preferably piezoelectric bimorphs, as described earlier in reference to FIG. 4, which bend in response to an applied voltage. This bending displaces the distal tongue portion 44 in a roughly lateral translation as indicated by the linear direction arrow 68. This lateral movement is coupled through the hinge 48, and causes the proximal portion 42 to rotate around the dimple 52, which serves as the center of rotation 54. The attached slider 20 is thus also rotated as indicated by the rotational direction arrow 70, and acts to steer the read/write head (not visible in this view).

FIG. 7 shows a second embodiment 100 of the head gimbal assembly 10, which uses actuator motors 25 which shorten or lengthen in response to an applied voltage. Again, the actuators may be piezoelectric in nature or could be Micro-Electro-Mechanical Systems (MEMS) as are well known in the art. This differential lengthening of the actuator motors 25 causes the distal tongue portion 44 to rotate, as indicated by rotational direction arrow 70. Again, this motion is coupled through the hinge 48 to the proximal tongue portion 42, causing it to rotate in a direction counter to that of the distal rotation as shown by rotational direction arrow 70, again resulting in a change in position of the slider 20 and the read/write head (not shown).

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A head gimbal assembly for a disk drive, comprising:
   a flexure having a stationary portion and at least one movable portion, a portion of said flexure being attached to the load beam;
   a slider including a read/write head, said slider being attached to one of said at least one movable portions of said flexure;
   a load beam providing a center of rotation for said slider; and
   at least one microactuator which connects between said stationary portion of said flexure and said at least one movable portion for applying a moment which causes pure or nearly pure rotation of said slider about said center of rotation.

2. A head gimbal assembly as in claim 1, wherein:
   said flexure includes a tongue having a plurality of portion.

3. A head gimbal assembly as in claim 2, wherein:
   said tongue includes said stationary portion and said at least one movable portion.

4. A head gimbal assembly as in claim 3, wherein:
   said at least one movable portion includes a proximal movable portion and a distal movable portion which are connected by at least one hinge.

5. A head gimbal assembly as in claim 4, wherein:
   said center of rotation is provided in the form of a dimple which projects from said load beam; and
   said slider is attached to said proximal portion, and said projecting dimple of said load beam contacts said proximal portion to form said center of rotation.

6. A head gimbal assembly as in claim 5, wherein:
   said at least one actuator connects said stationary portion of said flexure tongue to said distal portion so that when said at least one actuator is activated, movement is applied to said distal portion and then coupled to said proximal portion to create rotation of the slider about said center of rotation.

7. A head gimbal assembly as in claim 6, wherein:
   said actuators act to impart lateral motion to said distal portion which in turn acts to impart rotary motion to said proximal portion about said center of rotation.

8. A head gimbal assembly as in claim 6, wherein:
   said actuators act to impart rotary motion to said distal portion which in turn acts to impart rotary motion to said proximal portion about said center of rotation.

9. A head gimbal assembly as in claim 1, wherein:
   said stationary portion and said proximal movable portion of said flexure are connected by flexible springs which serve to bias said proximal movable portion of said flexure to a normal direction until deflected by movement of said at least one actuator.

10. A head gimbal assembly as in claim 1, wherein:
    said actuators include at least one actuator motor, where said actuator motors are chosen from a group consisting of piezoelectric extension motors, bimorph motors, MEMS and electromagnetic motors.

11. A head gimbal assembly as in claim 1, wherein:
    said at least one actuator includes a pair of actuator motors.

12. An actuator arm for a disk drive comprising:
    an arm beam having first and second ends, and having a primary actuator for coarse positioning of a read/write head at said first end, and a head gimbal assembly at said second end, said head gimbal assembly including:
    a flexure having a stationary portion and at least one movable portion, a portion of said flexure being attached to the load beam;
    a slider including, a read/write head, said slider being attached to one of said at least one movable portions of said flexure;
    a load beam providing a center of rotation for said slider; and
    at least one microactuator which connects between said stationary portion of said flexure and said at least one movable portion for applying a moment which causes pure or nearly pure rotation of said slider about said center of rotation.

13. An actuator arm assembly as in claim 12, wherein:
    said flexure includes a tongue having a plurality of portions.

14. An actuator arm assembly as in claim 13, wherein:

said tongue includes said stationary portion and said at least one movable portion.

15. An actuator arm assembly as in claim 14, wherein:

said at least one movable portion includes a proximal movable portion and a distal movable portion which are connected by at least one hinge.

16. An actuator arm assembly as in claim 15, wherein:

said center of rotation is provided in the form of a dimple which projects from said load beam; and said slider is attached to said proximal portion, and said projecting dimple of said load beam contacts said proximal portion to form said center of rotation.

17. An actuator arm assembly as in claim 16, wherein:

said at least one actuator connects said stationary portion of said flexure tongue to said distal portion so that when said at least one actuator is activated, movement is applied to said distal portion and then coupled to said proximal portion to create rotation of the slider about said center of rotation.

18. An actuator arm assembly as in claim 17, wherein:

said actuators act to impart lateral motion to said distal movable portion which in turn acts to impart rotary motion to said proximal movable portion about said center of rotation.

19. An actuator arm assembly as in claim 17, wherein:

said actuators act to impart rotary motion to said distal movable portion which in turn acts to impart rotary motion to said proximal movable portion about said center of rotation.

20. A disk drive with collocated secondary position actuation comprising:

a case including at least one rotatable data storage disk having data tracks;

one or more actuator arms, each arm having a primary actuator for coarse positioning of said actuator arm relative to said data tracks, and a head gimbal assembly using secondary collocated actuation;

said head gimbal assembly including:
a flexure having a stationary portion and at least one movable portion, a portion of said flexure being attached to the load beam;
a slider including a read/write head, said slider being attached to one of said at least one movable portions of said flexure;
a load beam providing a center of rotation for said slider; and
at least one microactuator which connects between said stationary portion of said flexure and said at least one movable portion for applying a moment which causes pure or nearly pure rotation of said slider about said center of rotation.

21. The disk drive recited in claim 20, wherein:

said flexure includes a tongue having a plurality of portions, including said stationary portion and said at least one movable portion, said at least one movable portion including a proximal movable portion and a distal movable portion which are connected by at least one hinge.

22. The disk drive recited in claim 21, wherein:

said center of rotation is provided in the form of a dimple which projects from said load beam; and said slider is attached to said proximal portion, and said projecting dimple of said load beam contacts said proximal portion to form said center of rotation, said at least one actuator connecting said stationary portion of said flexure tongue to said distal portion so that when said at least one actuator is activated, movement is applied to said distal portion and then coupled to said proximal portion to create rotation of the slider about said center of rotation.

23. The disk drive recited in claim 22, wherein:

said actuators act to impart lateral motion to said distal portion which in turn acts to impart rotary motion to said proximal portion about said center of rotation.

24. The disk drive recited in claim 22, wherein:

said actuators act to impart rotary motion to said distal portion which in turn acts to impart rotary motion to said proximal portion about said center of rotation.

25. The disk drive recited in claim 19, which further comprises a servo control, which detects deviations from the data tracks and produces servo control signals which activate said collocated microactuator to steer the read/write head back onto the data track.

26. A head gimbal assembly for providing secondary collocation actuation for a disk drive, comprising:

a flexure having a tongue which includes a stationary portion and at least one movable portion, said at least one movable portion including a proximal movable portion and a distal movable portion which are connected by at least one hinge;

a slider including a read/write head, said slider being attached to said proximal portion of said flexure tongue;

said slider is attached to, and said projecting dimple of said load beam contacts said proximal portion to form said center of rotation.

a load beam providing a dimple which projects from said load beam and which acts as a center of rotation for said slider; and at least one microactuator which connects between said stationary portion of said flexure and said at least one actuator connects said stationary portion of said flexure tongue to said distal portion so that when said at least one actuator is activated, movement is applied to said distal portion and then coupled to said proximal portion to create pure or nearly pure rotation of said slider about said center of rotation.

27. A head gimbal assembly as in claim 26, wherein:

said actuators act to impart lateral motion to said distal portion which in turn acts to impart rotary motion to said proximal portion about said center of rotation.

28. A head gimbal assembly as in claim 26, wherein:

said actuators act to impart rotary motion to said distal portion which in turn acts to impart rotary motion to said proximal portion about said center of rotation.

* * * * *